US010819238B1

United States Patent
King et al.

(10) Patent No.: US 10,819,238 B1
(45) Date of Patent: Oct. 27, 2020

(54) POWER SYSTEM HAVING MULTIPLE POWER CONVERSION UNITS WITH HANDOFF OF POWER REGULATION CONTROL

(71) Applicant: Cirrus Logic International Semiconductor, Ltd., Edinburgh (GB)

(72) Inventors: Eric J. King, Austin, TX (US); Eric B. Smith, Austin, TX (US); Hasnain Akram, Pflugerville, TX (US); Sean Davis, Austin, TX (US)

(73) Assignee: Cirrus Logic International Semiconductor, Ltd. (GB)

( * ) Notice: Subject to any disclaimer, the term of this patent is extended or adjusted under 35 U.S.C. 154(b) by 0 days.

(21) Appl. No.: 16/032,625

(22) Filed: Jul. 11, 2018

Related U.S. Application Data

(60) Provisional application No. 62/532,099, filed on Jul. 13, 2017.

(51) Int. Cl.
| | |
|---|---|
| *H02M 1/00* | (2006.01) |
| *H02M 3/158* | (2006.01) |
| *G05F 1/66* | (2006.01) |
| *H02M 3/00* | (2006.01) |

(52) U.S. Cl.
CPC ............ *H02M 3/1584* (2013.01); *G05F 1/66* (2013.01); *H02M 3/005* (2013.01); *H02M 3/1582* (2013.01); *H02M 2001/007* (2013.01); *H02M 2001/0067* (2013.01)

(58) Field of Classification Search
CPC ... G05F 1/66; H02M 1/096; H02M 2001/007; H02M 3/005; H02M 2001/0067; H02M 2001/0074; H02M 2001/0077; H02M 2001/0093; H02M 3/1584; H02M 2003/1586

See application file for complete search history.

(56) References Cited

U.S. PATENT DOCUMENTS

| | | | | |
|---|---|---|---|---|
| 5,815,389 | A * | 9/1998 | Plow ........................ | G06F 1/26 320/134 |
| 9,559,607 | B1 * | 1/2017 | Wang ...................... | G06F 1/263 |
| 2003/0006650 | A1 * | 1/2003 | Tang .................. | H02M 3/1584 307/43 |
| 2004/0061380 | A1 * | 4/2004 | Hann ........................ | H02J 1/06 307/43 |

(Continued)

*Primary Examiner* — Jue Zhang
*Assistant Examiner* — David A. Singh
(74) *Attorney, Agent, or Firm* — Kent B. Chambers; Terrile, Cannatti & Chambers, LLP

(57) ABSTRACT

A power supply system and method include multiple power conversion units (PCUs) with independent power generation control and a PCU-to-PCU regulation of power, handoff control system to transfer control of power regulation to a load among the PCUs. The multiple PCUs maintain independent power generation control to collectively provide power to the load and handoff regulation of the power to the load from one PCU to another PCU. The term "handoff" refers to communication between PCUs that affects a transfer and acceptance of regulation of power control. The independent PCU power generation control with singularly located but transferable control of the regulation of power provides a flexible dynamic power supply.

33 Claims, 12 Drawing Sheets

(56) References Cited

U.S. PATENT DOCUMENTS

| | | | | |
|---|---|---|---|---|
| 2004/0062058 A1* | 4/2004 | Hann | .................. | H02J 1/102 |
| | | | | 363/15 |
| 2006/0174145 A1* | 8/2006 | Chapuis | .................. | G06F 1/189 |
| | | | | 713/300 |
| 2006/0244570 A1* | 11/2006 | Leung | .................. | H02J 1/08 |
| | | | | 363/72 |
| 2006/0279969 A1* | 12/2006 | Leung | ............... | H02M 3/33515 |
| | | | | 363/41 |
| 2007/0040657 A1* | 2/2007 | Fosler | .................. | H02J 1/08 |
| | | | | 340/333 |
| 2016/0342546 A1* | 11/2016 | Sonnaillon | ............ | G06F 13/362 |
| 2018/0032124 A1* | 2/2018 | Fukuoka | ............... | G06F 1/3206 |

\* cited by examiner

POWER SYSTEM HAVING MULTIPLE POWER CONVERSION UNITS WITH HANDOFF OF POWER REGULATION CONTROL

CROSS-REFERENCE TO RELATED APPLICATIONS

The present application claims priority to U.S. Provisional Application Ser. No. 62/532,099, filed Jul. 13, 2017, titled "Tiled Boost Converter with Control Handoff", which is hereby incorporated in its entirety by reference.

BACKGROUND

A power system having multiple power conversion units with handoff of control of regulation a power to a load is disclosed.

Power converters are required in many applications. Power converters play vital roles in personal entertainment products, medical instruments, telecommunications equipment, industrial equipment, etc. Different power supply applications utilize various types of power converters, such as switching power converters, including boost converters, buck converters, boost-buck converters, and Ćuk converters.

FIG. 1 depicts an exemplary power supply system 100. In this example, a power source 104 provides power to a connected power conversion unit 102. The power conversion unit 102 converts the direct current (DC) input voltage Vin received from the power source 104 to a specified output voltage $V_{out}$ for provision to a load 106. In at least one embodiment, the power source 104 is any power source that provides a Direct Current (DC) input voltage Vin such as a battery or an Alternating Current-to-Direct Current (AC-to-DC) converter that converts an AC input voltage to the DC input voltage Vin via, for example, a rectifier, such as a diode bridge rectifier and capacitor (not shown). Load 106 may be any load. Power conversion unit 102 includes power conversion elements 108, such as one or more inductors, capacitors, diodes, and active switching elements, such as transistors, which are configured according the type of power conversion unit (i.e., boost, buck, boost-buck, Ćuk, etc.). A power controller 110 drives the active switching elements in the power conversion elements 108 to maintain the output voltage $V_{out}$ at a predetermined level. In various implementations, the power conversion unit 102 uses pulsed width modulation to control the active switching elements of the power conversion elements 108. The Background section of U.S. Pat. No. 8,866,452, entitled "Variable Minimum Input Voltage Based Switching in an Electronic Power Control System" describes an exemplary boost-type switching power converter.

The power conversion unit 102 is configured to safely supply a pre-determined maximum current. However, in some applications of the power supply system 100, the load 106 may be configured to draw a larger amount of current than the current available from the power conversion unit 102. For example, the current required by the load 106 may exceed the maximum output current $I_{out}$ available from power conversion unit 102. To meet the power demands of load 106, two or more power conversion units 102 (not shown) may be connected to the load 106 in parallel to maintain an output voltage Vout while increasing a maximum available output current Tout. However, use of parallel connected power conversion units may impose challenging and substantial operational issues.

SUMMARY

In at least one embodiment, an apparatus includes a power supply system, and the power supply system includes a plurality of power conversion units (PCUs) configured to provide power to a load. During operation of the power supply system, one or more of the PCUs provides power to the load while only one of the PCUs controls regulation of the power to the load at a given time. The power supply system further includes one or more power regulation handoff communication control systems to transfer control of the regulation of the power to the load among the PCUs. In at least one embodiment, one or more of the power regulation handoff communication control systems transfer among the PCUs control of the regulation of the power to the load in response to detection of an operating parameter of the power supply system reaching a predetermined threshold level.

In another embodiment, a method of operating a power supply system to provide power to a load includes operating a plurality of power conversion units (PCUs) to provide power to the load, wherein one or more of the PCUs provides power to the load while only one of the PCUs controls regulation of the power to the load at a given time. The method further includes transferring control of the regulation of the power to the load among the PCUs in response to detection of an operating parameter of the power supply system reaching a predetermined threshold level.

BRIEF DESCRIPTION OF THE DRAWINGS

Embodiments of the present disclosure may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
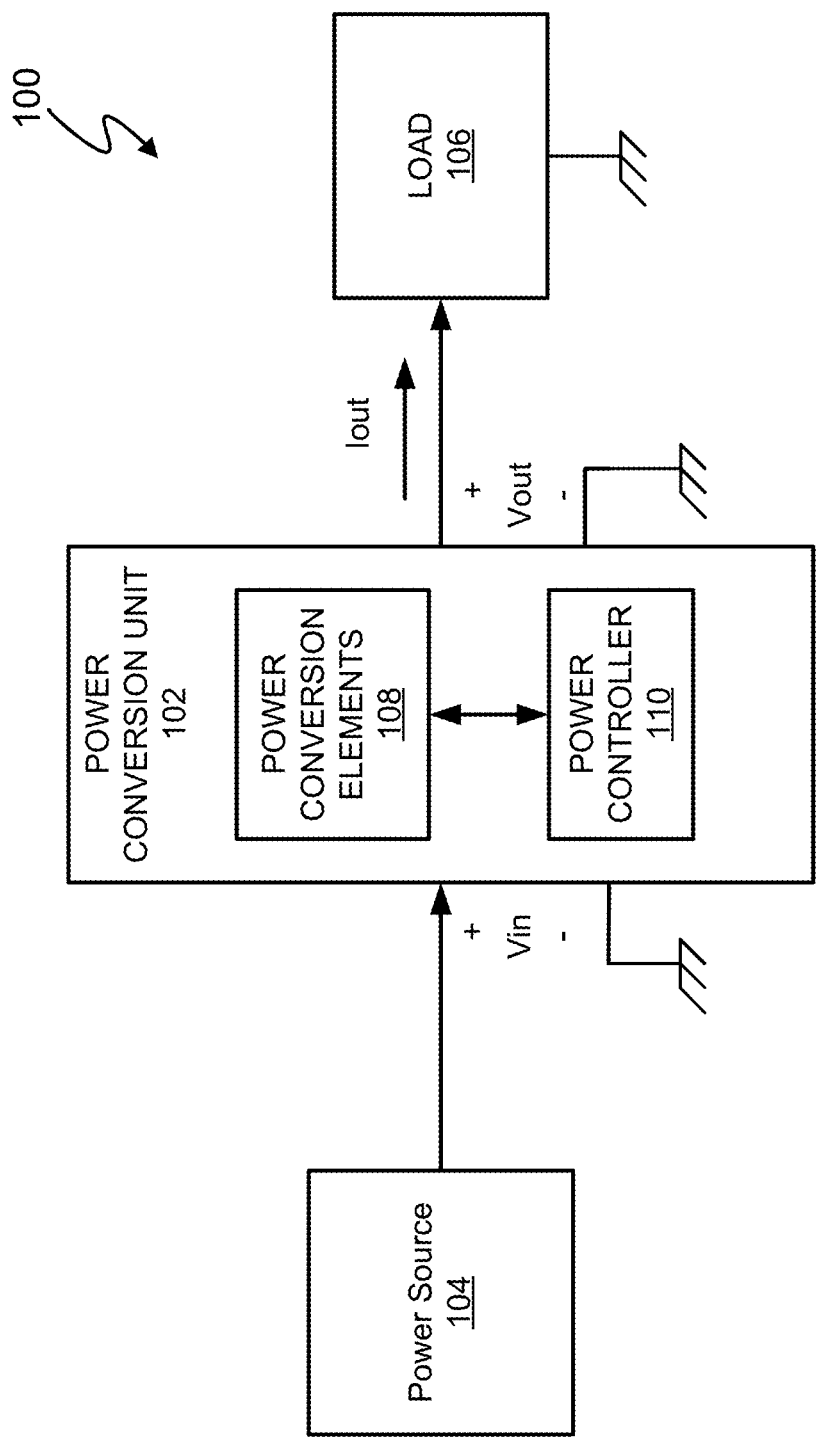
FIG. 1 (labeled prior art) depicts an exemplary power supply system.

A power supply system and method include multiple power conversion units (PCUs) with independent power generation control and a PCU-to-PCU regulation of power, handoff control system to transfer control of power regulation to a load among the PCUs. Thus, the multiple PCUs maintain independent power generation control to collectively provide power to the load and independent or dependent handoff of control of regulation of the power to the load from one PCU to another PCU. The term "handoff" refers to communication between PCUs that effects a transfer and acceptance of regulation of power control. In at least one embodiment, "independent" handoff control refers to each PCU having a handoff controller that operates independently of other handoff controllers. In at least one embodiment, "dependent" handoff control refers to control of PCU-to-PCU handoff of the regulation of power by a master handoff controller coupled to multiple PCUs in the power supply system. In at least one embodiment of a multiple PCU power supply system, the independent PCU power generation control with singularly located but transferable control of the regulation of power provides a flexible system that, for example, dynamically increases and decreases power to the load in an operationally and thermally efficient manner, provides a simpler power regulation control system relative to centralized, conventional power regulation control of multiple PCUs, and decreases power provision latency in response to changes in power demands of the load relative to at least some conventional systems.

The particular PCU-to-PCU handoff control system is a matter of design choice and may include handoff controllers distributed among each of the PCUs. In at least one embodiment, the power supply system also includes a master handoff controller to initiate PCU-to-PCU regulation of power handoff. The PCUs are each capable of providing power separately and collectively to the load. In at least one embodiment, only one of the PCUs controls regulation of power to the load at any given time, while one or more of the remaining PCUs also aggregates power with the controlling PCU to provide power to the load. Thus, in at least one embodiment, one or more PCUs provide power to the load, but only one of the PCU's at any given time actually varies an output of the PCU to regulate power to the load. For example, if PCU(1) and PCU(2) provide power to a load, in at least one embodiment, PCU(1) maintains a constant power parameter at a steady state (e.g. constant input current, constant output current, constant output voltage, and/or constant input voltage) and PCU(2) provides a variable power parameter output to the load to meet the power demand of the load and, thus, regulate power to the load. Thus, for example, for a pulse width modulated (PWM) control PCU, in at least one embodiment, one or more PCUs that are not regulating power to the load, deliver a constant power to the load, while the PCU that regulates power to the load varies a PWM control signal to provide a variable power to the load and regulate the total power delivered to the load. Thus, when multiple PCUs are providing power to the load, the PCUs collectively provide power to the load while one PCU regulates the power to the load.

Conventional power supplies use a common controller to regulate all of the outputs of the PCUs at the same time. However, the power supply system with PCU-to-PCU power regulation control transfer includes one or more power control regulation handoff communication control systems to transfer control of the power regulation from PCU-to-PCU. The efficient power supply architecture and corresponding operation of PCU-to-PCU power regulation control handoff allows, for example, parallel connection of power conversion units (PCUs) to dynamically increase and decrease power to the load in an operational and thermally efficient manner. In at least one embodiment, handing off power regulation control from PCU-to-PCU provides a simpler power regulation control system relative to centralized, conventional power regulation control. In at least one embodiment, the architecture of the PCU-to-PCU power regulation handoff allows for low bandwidth communications between the PCUs, thereby making the architecture easily scalable to add more PCUs, as opposed to a multiple PCU architecture with one master and multiple slaves that generally requires a relatively higher communication bandwidth. Conventional master/slave, multiple PCU architectures need high bandwidth communications from the master, which may limit expansion of the conventional system by restricting inclusion of additional PCUs. Furthermore, in at least one embodiment, PCU-to-PCU power regulation control facilitates staggered usage of PCUs in accordance with quantized PCU current output that allows PCUs to concurrently deliver power to the load, while enhancing efficiency and thermal performance. In at least one embodiment, thermal benefits come from delivering output power from multiple PCUs in a way that balances the thermal dissipation across devices to prevent overheating and/or excess thermal load for any one PCU.

In at least one embodiment, one or more of the PCUs concurrently provide power to the load. In at least one embodiment, each PCU of the power supply system includes a power controller connected to a feedback loop (not shown). In at least one embodiment, the feedback loop includes one or more components, such as a sense resistor, to sense power demand of the load to facilitate at least one PCU adjusting the collective output power of the PCUs of the power supply system to meet the power demand of the load. Only one PCU (the controlling PCU) controls regulation of the power (ROP) to the load at a given time. That is, only the output of the controlling PCU is adjusted to compensate for power requirement variations of the load while the other PCUs maintain their power output at a constant level.

During operation, control of the ROP is handed off from PCU-to-PCU. To this end, the PCUs communicate with one another to allow handoff of the control of the ROP from the controlling PCU to any other PCU in the system having handoff capability. The PCU to which the control of the ROP is transferred then becomes the controlling PCU. Thus, the system effectively distributes control of the ROP among multiple PCUs with one PCU exercising control of the ROP at any particular time.

In various examples, the one or more power regulation handoff communication control systems employ one or more handoff control strategies to determine when to handoff power regulation control from PCU-to-PCU and determine the PCU-to-PCU regulation of power handoff control sequencing. In at least one embodiment, the handoff control strategies are implemented as a set of rules that are programmed into memory and executed by one or more processors of the one or more power regulation handoff communication control systems. In at least one embodiment, the rules respond to one or more specific sensed operational parameters of the power supply system that are a matter of design choice, such as power demand, thermal threshold boundaries, PCU current input, and PCU current output or other operating levels. For example, in at least one embodiment, handoff of the control of the ROP from PCU-to-PCU occurs when one or more operating parameters of the power supply system reach a predetermined threshold level. In various examples, the predetermined threshold levels may include one or more of a current input threshold levels of the controlling PCU, a current output threshold level for the controlling PCU, a thermal threshold level associated with the controlling PCU, and/or the voltage output of a control loop of the controlling PCU. In at least one embodiment, the handoff control strategies utilize other operating parameters to control power regulation control handoff from PCU-to-PCU, such as the local temperature in a region of a printed circuit board or other substrate proximate to one or more of the PCUs. For example, in at least one embodiment, the power regulation handoff communication control systems hand off control of the ROP to a PCU located in an area of lower local temperature or an area that may better tolerate a higher temperature. The particular type and values of operational parameter thresholds to determine when the handoff communication control systems hand off control of the ROP from PCU-to-PCU is a matter of design choice.

Figure 2:
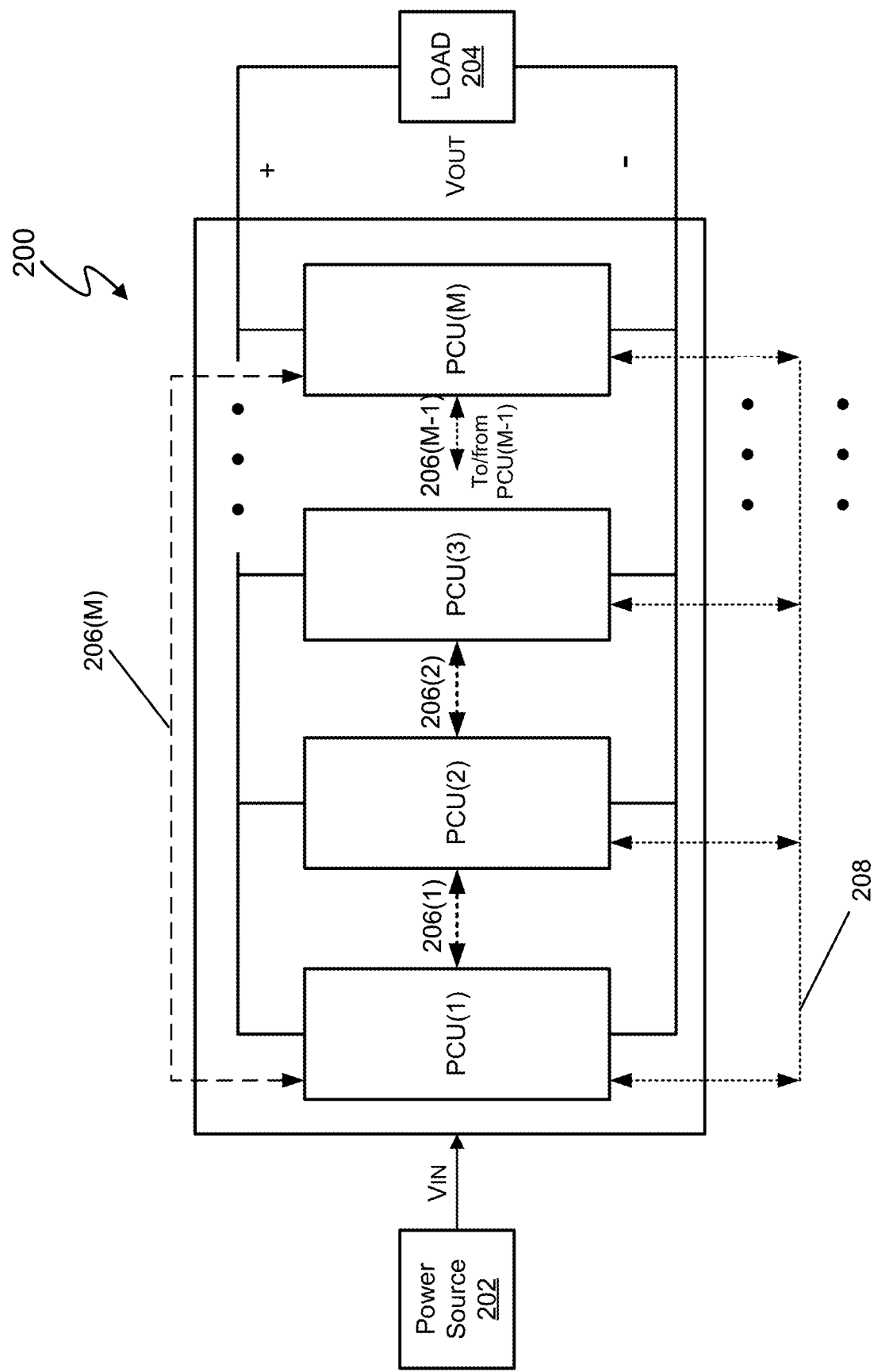
FIG. 2 depicts an exemplary power supply system having multiple power control units (PCUs) and configured with PCU-to-PCU communication for handoff of control of the regulation of power to the load.

FIG. 2 depicts an exemplary power supply system 200. Power supply system 200 includes M×PCUs, shown as PCU(1), PCU(2), PCU(3), through PCU(M), where M is an integer greater than or equal to 2. The particular value of M is a matter of design choice and depends on, for example, the maximum output power of the PCUs and the maximum power demand of the load 204. The parallel connected PCUs(1:M) receive power including an input voltage VIN from power source 202 and provide a regulated output voltage $V_{OUT}$ to load 204. The nomenclature "(X:Y)" refers to integers "X" through "M". For example, PCU(1:4) refers to PCU(1), PCU(2), PCU(3), and PCU(4). Power source 202 may be any DC power source including rectified utility power (110V/60 Hz or 220V/50 Hz) or a DC battery.

During operation, one or more of the PCUs provides power to the load 204. In some instances, a single PCU may provide power to the load 204 while the others do not. The load 204 may be any type of load. In other instances, multiple PCUs provide power to the load 204 at the same time. However, while one or more of the PCUs provides power to load, only one of the PCUs adjusts its power output level at a given time in response to variations in the power requirements of the load 204. In this example, when PCU(1) is the controlling PCU, i.e. PCU(1) is controlling ROP to the load 204, PCUs(2:M) maintain one or more of their respective operating parameters at a constant level. In various exemplary embodiments, the respective operating parameters maintained by PCUs(2:M) at a constant level include one or more of: (i) power output from the PCU, (ii) power input to the PCU, (iii) current output from the PCU, and/or (iv) current input to PCU. For M equal four (4), the power supply system 200 has four PCUs, i.e. PCU(1), PCU(2), PCU(3), and PCU(4). When PCU(1) is the controlling PCU controlling the ROP to the load, only PCU(1) adjusts one or more of its power operating parameters to compensate for varying load requirements until such time as PCU(1) hands off control of the ROP to another PCU. Similarly, when PCU(2) is the controlling PCU, PCU(1), PCU(3), and PCU(4) maintain one or more of their own power operating parameters at respective constant operating parameter levels. Thus, when PCU(2) is the controlling PCU controlling the ROP to the load, only PCU(2) adjusts its operating parameter to compensate for varying load requirements until such time as control of the ROP to load 204 is handed off to another PCU. In at least one embodiment, PCU(2) hands off control of the ROP to another PCU. Likewise, when PCU(3) is the controlling PCU, PCU(1), PCU(2), and PCU(4) maintain their respective operating parameters at a constant level. In this embodiment, only PCU(3) adjusts its operating parameter to compensate for varying load requirements until such time as PCU(3) hands off control of the ROP to another PCU. Similarly, when PCU(4) is the controlling PCU, PCU(1), PCU(2), and PCU(3) maintain their own operating parameter at a constant power level. Only PCU(4) adjusts its operating parameter to compensate for varying load requirements until such time as PCU(4) hands off control of the ROP to another PCU.

One or more power regulation handoff communication control systems direct handoff of the control of the ROP from PCU-to-PCU. In at least one embodiment, the PCUs communicate with at least one other PCU to handoff control of the ROP. In at least one embodiment, the PCUs are connected for communication in a daisy-chain as shown by communication lines 206(1)-206(M−1). In another embodiment, the PCUs communicate with one another over a common communication bus 208. The number of PCUs communicatively coupled to each PCU is a matter of design choice. For example, if the handoff control always follows a predetermined, unidirectional, single path, index sequential pattern, each PCU may be communicatively coupled to only the next PCU in the path as shown by communication lines 206(1)-206(M−1). Additionally, or in the alternative, one or more of the PCUs may be communicatively coupled to multiple PCUs to transfer control of the ROP in a pre-determined and/or dynamic, multi-path, bidirectional pattern over the common communication bus 208. Communicatively coupling the PCUs to multiple PCUs in this latter manner increases path communication options and handoff sequencing order. For example, such coupling allows some PCUs to exercise control of the ROP more frequently than others. In other embodiments, if the controlling PCU attempts to handoff control of the ROP to another PCU that is unable to accept control (e.g., the PCU is at its limits of operation, the PCU has failed, etc.), the controlling PCU may handoff control of the ROP to a PCU that is capable of accepting control. Various architectures and processes for power regulation handoff communication control systems are set forth below.

The process of handing off control from PCU-to-PCU is a matter of design choice. In various embodiments, handoff of control of the ROP between the PCUs occurs in response to the detection of an operational parameter of the power supply system 200 reaching a predetermined threshold level. As noted above, the predetermined threshold level may include one or more of a current input threshold level of the controlling PCU, a current output threshold level of the controlling PCU, a thermal threshold level associated with the controlling PCU, and/or the voltage output of a control loop of the controlling PCU. Other operating parameters may also be utilized, such as the local temperature in a region of a printed circuit board or other substrate proximate to one or more of the PCUs.

Figure 3:
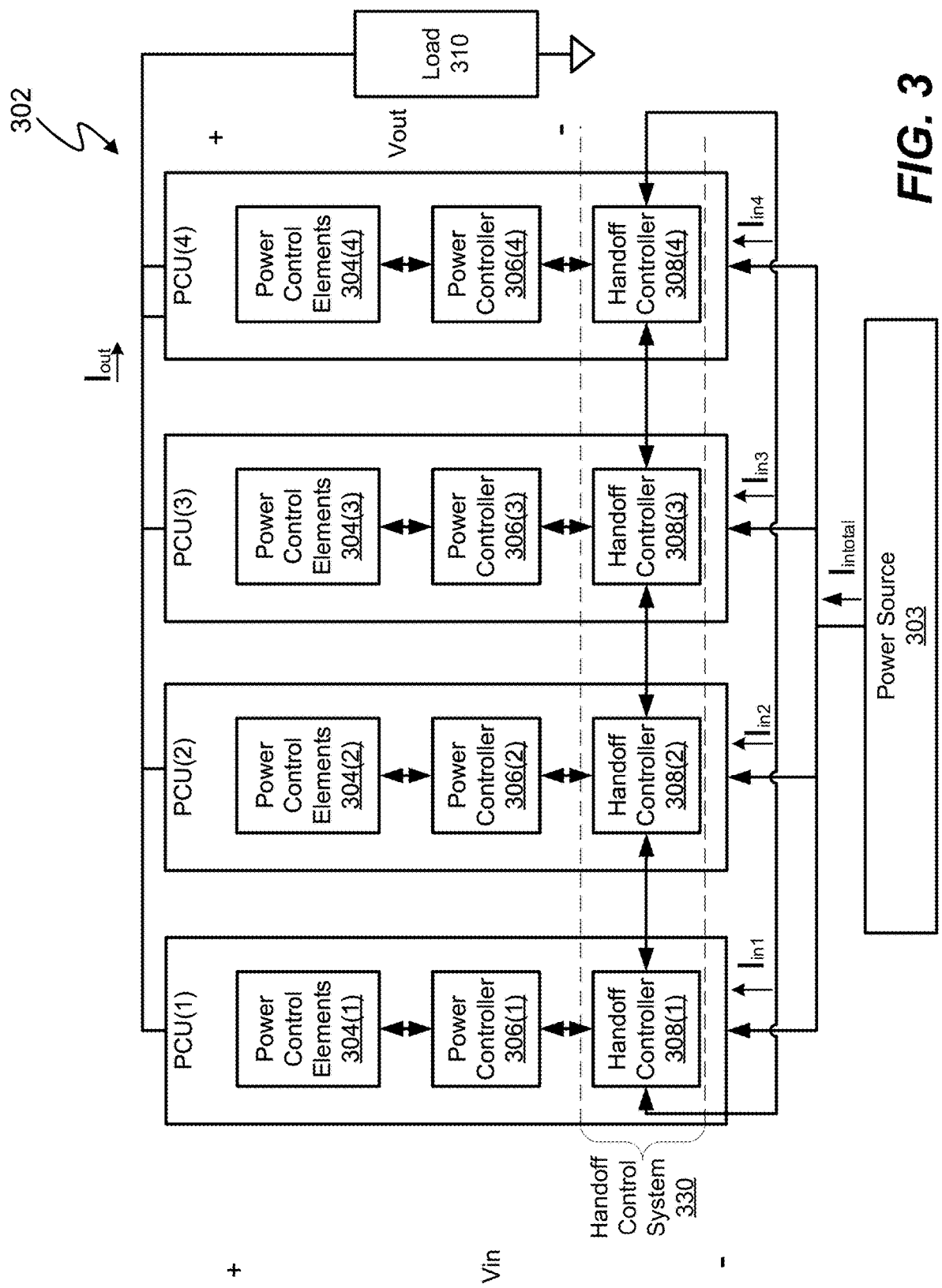
FIG. 3 depicts another embodiment of a power supply system having multiple PCUs with PCU-to-PCU communication for handing off control of the regulation of power to the load.

FIG. 3 depicts another embodiment of a power supply system 300 having multiple PCUs with PCU-to-PCU communication for handoff of control of the ROP. Here, without limitation, the power supply system 300 includes four PCUs shown as PCU(1)-PCU(4). The number of PCUs, however, may be greater than or less than four and is a matter of design choice. The implementation of the PCUs is a matter of design choice. In at least one embodiment, the PCUs are implemented as switching power converters, such as boost converters, buck converters, boost-buck converters, Ćuk converters, or a combination of such converters.

As shown, the ith PCU, PCU(i), includes subsequently described power control elements 304(i), a power controller 306(i), and a handoff controller 308(i), and i is an element of the set {1, 2, 3, and 4}. For example, if "i" is 1, then PCU(i) refers to PCU(1), handoff controller 308(i) refers to handoff controller 308(1), and so on. In a switching power supply, the power control elements 304(1:4) include energy transfer components, such as one or more inductors, capacitors, diodes, and active switching elements such as transistors, and the like, (not shown) which are configured depending on the type of power conversion unit (i.e., boost, buck, boost-buck, Ćuk, etc.). The power controllers 306(1:4) include, for example, a switching power converter controller to drive the active elements (not shown) of the respective power control elements 304(1:4) to regulate the power that each of the respective PCUs(1:4) provides to load 310. Each of the handoff controllers 308(1:4) communicates with at least one other of the handoff controller of another PCU to handoff and receive control of the ROP to and from at least one other PCU.

For purposes of the following discussion, the operational parameter used to determine when the handoff of the ROP occurs is the input current to the controlling PCU. Generally stated, when the input current to the controlling PCU reaches a predetermined threshold level, control of the ROP is handed off to another PCU. However, different operational parameters may also be employed, such as temperature. In some embodiments, different PCUs use different operational parameter types and/or threshold levels for handoff control.

Referring to FIG. 3, the power source 303 of power supply system 302 provides a total input current $I_{intotal}$ equaling the total current collectively drawn by the PCUs (1:4). Here, PCU(1) draws an input current $I_{in1}$, PCU(2) draws an input current $I_{in2}$, PCU(3) draws an input current $I_{in3}$, and PCU(4) draws an input current $I_{in4}$. Therefore, the total current drawn from the DC power source 204 is $I_{intotal}=I_{in1}+I_{in2}+I_{in3}+I_{in4}$, and the value of the total input current $I_{intotal}$ increases and decreases in response to the electrical current needs of the load $I_{out}$ and/or input power changes such as changes to the input voltage Vin.

In this example, each PCU of PCUs(1:4) uses one or more input current limits as operational parameter threshold levels for handoff of the control of the ROP to another PCU. To this end, the input current limits for each PCU may be quantized into N levels. Assuming N=5, the input current thresholds for PCU(1) are $I_{in1L0}$, $I_{in1L1}$, $I_{in1L2}$, $I_{in1L3}$, and $I_{in1L4}$. The input current thresholds for PCU(2) are $I_{in2L0}$, $I_{in2L1}$, $I_{in2L2}$, $I_{in2L3}$, and $I_{in2L4}$. The input current thresholds for PCU(3) are $I_{in3L0}$, $I_{in3L1}$, $I_{in3L2}$, $I_{in3L3}$, and $I_{in3L4}$. The input current thresholds for PCU(4) are $I_{in4L0}$, $I_{in4L1}$, $I_{in4L2}$, $I_{in4L3}$, and $I_{in3L4}$.

The controlling PCU executes a communication method such that, upon reaching a high or low quantized current limit, the controlling PCU hands off control of the ROP to another PCU. The control handoff recipient PCU then becomes the controlling PCU. If the power demand and, thus, the output current $I_{out}$ to the load 310 decreases below a quantized current limit of the controlling PCU(i), in at least one embodiment, the handoff controller of the controlling PCU(i) responds by handing off control of the ROP to another PCU to remove or at least reduce power output to the load 310 by PCU(i). PCU(i) maintains a zero or reduced power output to the load 310 so long as PCU(i) is not the controlling PCU. The index "(i)" is a value that identifies any of PCUs(1:4). If PCU(i) hands off ROP control to another PCU in response to an increase in power demand by the load 310, in at least one embodiment, PCU(i) hands off control of the ROP to another PCU and maintains a predetermined power output level, such as continuous power at a quantized limit, so long as the PCU(i) does not have control of the ROP.

In FIG. 3, the power regulation handoff communication control system 330 includes the handoff controllers 308(1:4), which are respectively included in PCU(1), PCU(2), PCU(3), and PCU(4). Handoff controllers 308(1:4) are communicatively connected in series, daisy chain loop, i.e. a linear, bidirectional sequencing series.

Figure 4:
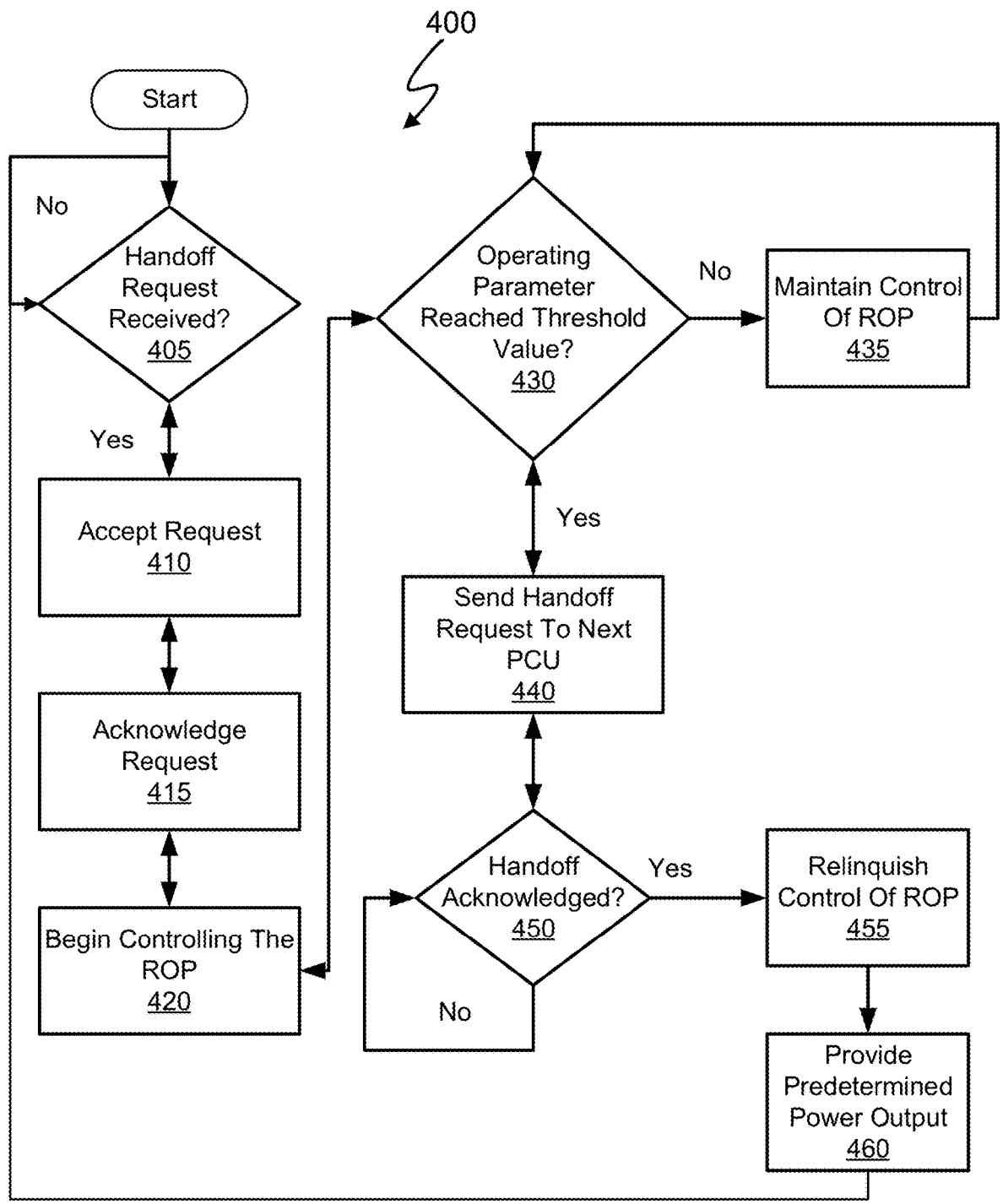
FIG. 4 depicts an exemplary selection algorithm for PCU-to-PCU handoff of control of the power regulation to the load.

FIG. 4 depicts an exemplary selection algorithm 400 for PCU-to-PCU handoff of control of the ROP. Referring to FIGS. 3 and 4, the handoff controllers 308(1:4) of respective PCUs(1:4) are each configured to execute handoff the ROP to the load 310 in accordance with a handoff selection algorithm. The particular handoff selection algorithm is a matter of design choice. In the selection algorithm 400, whenever PCU(i) is not controlling ROP to the load 310, PCU(i) waits at operation 405 to receive a ROP control handoff request from at least one of the other PCUs to take control of the ROP to the load 310. When the handoff request is received, the PCU(i) accepts the handoff request at operation 410 and acknowledges the request at operation 415 by sending an acknowledgment to the then-current controlling PCU. However, if PCU(i) is in a state in which PCU(i) cannot accept control of the ROP, PCU(i) refuses the handoff request by, for example, refusing the request through an affirmative direct response to the controlling PCU or by simply not acknowledging the request. In such instances, the controlling PCU may continue controlling the ROP or attempt to handoff control of the ROP to an alternative PCU. PCU(i) may refuse the request for any number of reasons, such as PCU(i) is inoperative or is exceeding thermal limits. However, assuming the PCU(i) can accept the handoff request to become the controlling PCU, PCU(i) acknowledges and accepts the handoff request and becomes the controlling PCU and begins controlling the ROP at operation 420. In one embodiment, the transitioning of the handoff of control of the ROP may occur as a dead-reckoning to ensure a clean transition of the ROP.

Whenever the PCU(i) has control of the ROP, PCU(i) monitors a level of an operating parameter (e.g., $I_{in(i)}$ to the PCU(i) controlling the ROP) at operation 430 to determine if the operating parameter has reached any predetermined threshold level, such as a high or low current limit or a high temperature threshold. If the operating parameter has not reached a predetermined threshold level, the PCU(i) maintains control of the ROP at operation 435 and continues monitoring the operating parameter at operation 430. When the operating parameter reaches any threshold level, PCU(i) sends a handoff request to one of the other PCUs at operation 440 to take over ROP control. PCU(i) waits at operation 450 to determine whether the handoff is acknowledged by the other PCU. However, in at least one embodiment, if the controlling PCU does not receive an acknowledgment, PCU(i) may request handoff of control of the ROP to another PCU and continue as the controlling PCU until such time as another PCU affirmatively accepts a request to become the controlling PCU by, for example, affirmatively responding to the handoff request. Upon acknowledgment of the handoff request, the controlling PCU relinquishes control of the ROP at operation 455. At operation 460, if the power demand by the load 310 has increased beyond the capability of the controlling PCU to ROP to the load 310, the PCU that just relinquished control maintains its own operating parameter at a constant level. For example, if the controlling PCU(i) transferred control of the ROP to the load based upon an input current to the controlling PCU(i) exceeding a predetermined threshold, then the PCU(i) maintains a constant input current at a predetermined level, such as at or near the predetermined threshold. Other operating parameters of PCU(i) may change due to, for example, external changes such as changes to an input voltage to PCU(i). In at least one embodiment, power controller 306(i) sets the operating parameter of PCU(i), which relinquished control of the ROP, to a constant level, such as a level that maintains the power level at which PCU(i) handed off control of the ROP to another PCU if the power demand of the load 310 increases. If the power demand of the load decreases, in at least one embodiment, the previously controlling PCU(i) ceases providing power to the load 310, or power controller 306(i) changes the operating parameter of PCU(i) to a constant, predetermined operating parameter level corresponding to the reduced needs of the load. While providing the predetermined power output in operation 460, PCU(i) also performs operation 405 to monitor for reception of a subsequent handoff request from another PCU. When a subsequent handoff request is received, PCU(i) repeats the selection algorithm 400.

Figure 5:
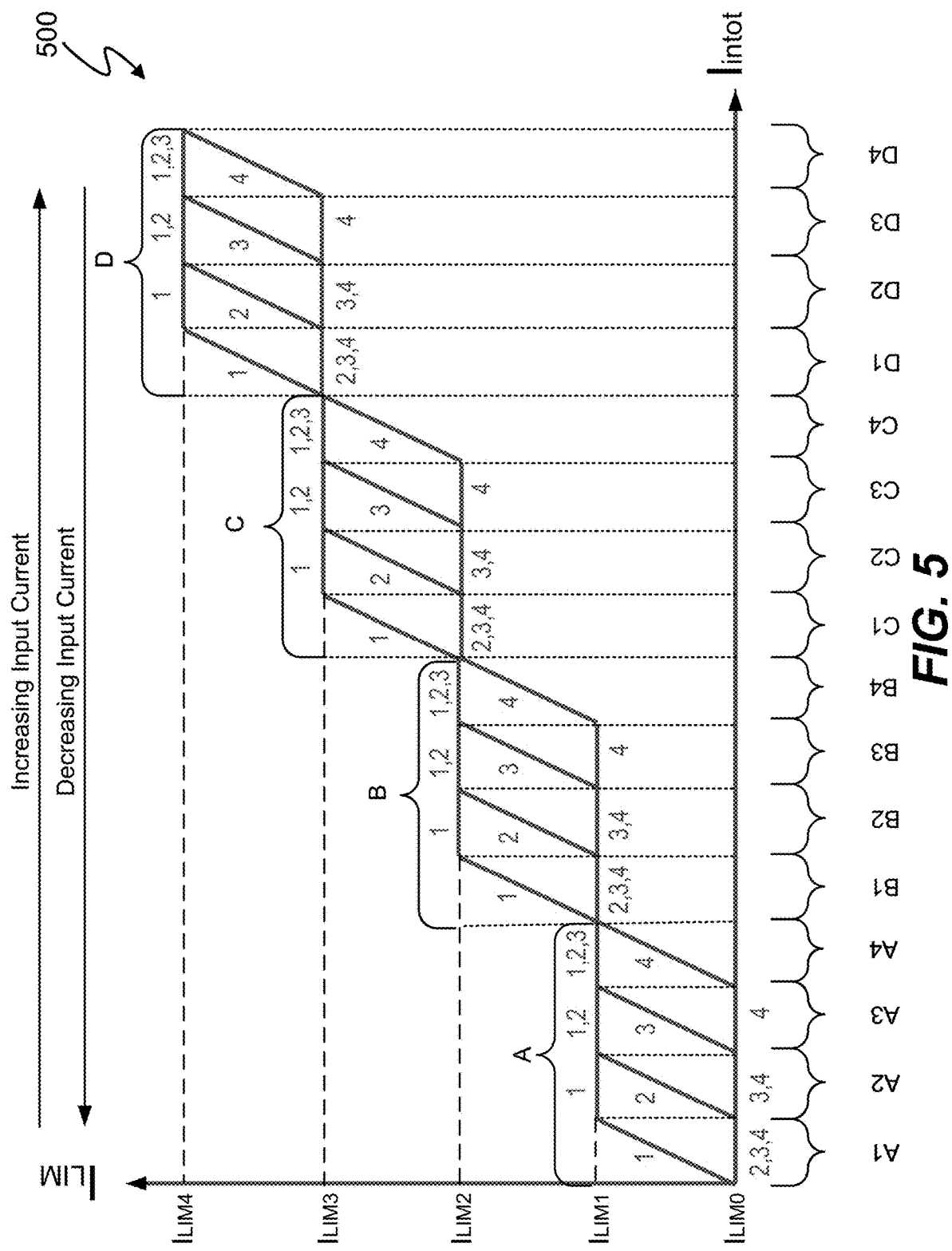
FIG. 5 depicts a transition diagram for PCU-to-PCU handoff of the control of regulation of power to the load in the power supply system shown in FIG. 3.

FIG. 5 depicts an exemplary ROP control transition diagram 500 for PCU-to-PCU handoff of the control of the ROP to the load 310 by the power supply system 302. Referring to FIGS. 3-5, handoff controllers 308(1:4) handoff control of the ROP in response to the input current $I_{in(i)}$ of the controlling PCU(i). For simplicity, it is again assumed that the current limit thresholds for each of the PCUs(1:4) are quantized at four different levels (e.g., N=5). Further, it is assumed that each of the PCUs(1:4) have the same current input limit threshold levels for each quantized input current level, i.e.:

$I_{LIM0}=I_{in1L0}=I_{in2L0}=I_{in3L0}=I_{in4L0}$;

$I_{LIM1}=I_{in1L1}=I_{in2L1}=I_{in3L1}=I_{in4L1}$;

$I_{LIM2}=I_{in1L2}=I_{in2L2}=I_{in3L2}=I_{in4L2}$;

$I_{LIM3}=I_{in1L3}=I_{in2L3}=I_{in3L3}=I_{in4L3}$; and $I_{LIM4}=I_{in1L4}=I_{in2L4}=I_{in3L4}=I_{in4L4}$.

The vertical axis $I_{LIM}$ of the ROP control transition diagram 500 corresponds to the input current threshold limits $I_{LIM(1:4)}$, and the horizontal axis $I_{intot}$ corresponds to the total input current provided from the power source 303 to the PCUs(1:4). The total input current $I_{intot}$ is related to the current output $I_{out}$ and varies in time with the power requirements of the load 310.

The horizontal axis $I_{intot}$ of the transition diagram 500 is divided into four regions: A, B, C, and D. Within Region A, the current limit $I_{LIM1}$ is the threshold at which the controlling PCU hands off control of the ROP to another PCU as the input current to the controlling PCU increases, and the current limit $I_{LIM0}$ is used as the threshold at which the controlling PCU hands off control of the ROP to another PCU as the input current to the controlling PCU decreases. The input current to the controlling PCU may change due to, for example, (i) changes in the input voltage $V_{in}$ while the power requirements of the load remain constant and (ii) changes in the power requirements of the load when the input voltage $V_{in}$ remains constant. Within Region B, the current limit $I_{LIM2}$ is used as the threshold at which the controlling PCU hands off control of the ROP to another PCU as the input current to the controlling PCU increases, while the current limit $I_{LIM1}$ is used as the threshold at which the controlling PCU hands off control of the ROP to another PCU as the input current to the controlling PCU decreases. Within Region C, the current limit $I_{LIM3}$ is used as the threshold at which the controlling PCU hands off control of the ROP to another PCU as the input current to the controlling PCU increases, while the current limit $I_{LIM2}$ is used as the threshold at which the controlling PCU hands off control of the ROP to another PCU as the input current to the controlling PCU decreases. Within Region D, the current limit $I_{LIM4}$ is used as the threshold at which the controlling PCU hands off control of the ROP to another PCU as the input current to the controlling PCU increases, while the current limit $I_{LIM3}$ is used as the threshold at which the controlling PCU hands off control of the ROP to another PCU as the input current to the controlling PCU decreases.

Each region A, B, C, and D is subdivided into four sub-regions, corresponding to which of the PCUs has control of the ROP while in the respective region. In sub-region A1, PCU(1) is the controlling PCU and has control of the ROP to the exclusion of PCU(2), PCU(3), and PCU(4). Only PCU(1), as the controlling PCU, adjusts its power output load in sub-region A1 in response to changes in the power requirements of the load 310. As the current needs of the load 310 increase, the level of $I_{intot}$ also increases until such time as $I_{in1}$ reaches the first threshold limit $I_{LIM1}$. Control of the ROP is then passed from PCU(1) to PCU(2), which then controls the ROP in sub-region A2 to the exclusion of PCU(1), PCU(3), and PCU(4). Further, the current input to PCU(1) remains constant after control has been handed off so that both PCU(1) and PCU(2) provide current to the load in response to the increased power requirement. Only PCU (2), as the controlling PCU, adjusts its power output load in sub-region A2 in response to changes in the power requirements of the load 310. As the current needs of the load 310 further increase, the level of $I_{intot}$ also increases until such time as $I_{in2}$ reaches the first threshold limit $I_{LIM1}$. Control of the ROP is then passed from PCU(2) to PCU(3), which controls the ROP in sub-region A3 to the exclusion of PCU(1), PCU(2), and PCU(4). In sub-region A3, the current provided to the load 310 by PCU(1) and PCU(2) remains constant. Only PCU(3), as the controlling PCU, adjusts its power output load in sub-region A3 in response to changes in the power requirements of the load 310. A further handoff of control of the ROP from PCU(3) to PCU(4) occurs when $I_{in4}$ reaches the first threshold limit $I_{LIM1}$. Within sub-region A4, PCU(4) has control of the ROP to the exclusion of PCU(1), PCU(2), and PCU(3). The current provided to the load 310 by PCU(1), PCU(2), and PCU(3) is maintained after the handoff to meet the power requirements of the load. Only PCU(4), as the controlling PCU, adjusts its power output load in sub-region A4 in response to changes in the power requirements of the load 310.

Once operation of the PCUs has passed between all of the sub-regions of Region A, the PCUs enter the operational zone shown in Region B. Handoff of control of the ROP is similar to the operation of the PCUs in Region A. However, handoff of control of the ROP in Region B occurs in response to the input current of the controlling PCU reaching a second threshold limit $I_{LIM2}$. Similarly, handoffs of control of the ROP in Region C occur in response to the input current of the controlling PCUs reaching a third current threshold limit $I_{LIM3}$. Likewise, handoffs of control of the ROP in Region D occur in response to the input current of the controlling PCUs reaching a fourth current threshold limit $I_{LIM4}$.

Handoff of the control of the ROP has been described in the context of increasing current demands of the load 310. However, the handoff control is active and dynamically responds by changing the PCU that controls ROP to the load 310 as the power demands of the load 310 increase and decrease. In at least one embodiment, for a constant output voltage $V_{OUT}$, changes in output current $I_{OUT}$ demand are directly proportional to changes in power demand by the load 310. In this regard, as the output current $I_{OUT}$ needs of the load 310 decrease, the power output of the PCU handing off control of the ROP may likewise be reduced to compensate for the reduced power requirements of the load 310. With reference to Region D, PCU(4) has control of the ROP in sub-region D4 until the current at its input drops to $I_{LIM3}$. PCU(4) then passes control of the ROP to PCU(3), which maintains control of the ROP in sub-region D3. However, the power output of PCU(4) in sub-region D3 is reduced to compensate for the reduced power requirements of the load 310. As the power requirements of the load 310 further decrease, PCU(3) controls the ROP until the current at its input drops to $I_{LIM3}$ at which point PCU(3) passes control of the ROP to PCU(2), which controls the ROP in sub-region D2. When in sub-region D2, the power output of PCU(3) is reduced from its prior state to compensate for the reduced power requirements of the load 310. As the power requirements of the load 310 decrease still further, PCU(2) controls the ROP until the current at its input drops to $I_{LIM3}$ at which point PCU(2) passes control of the ROP to PCU(1) and the power output of PCU(2) is reduced. This mode of operation in which the PCUs that handoff control of the ROP reduce their power output to the load after handoff is complete occurs throughout the transitions shown in Region D, Region C, Region B, and Region A.

Figure 6:
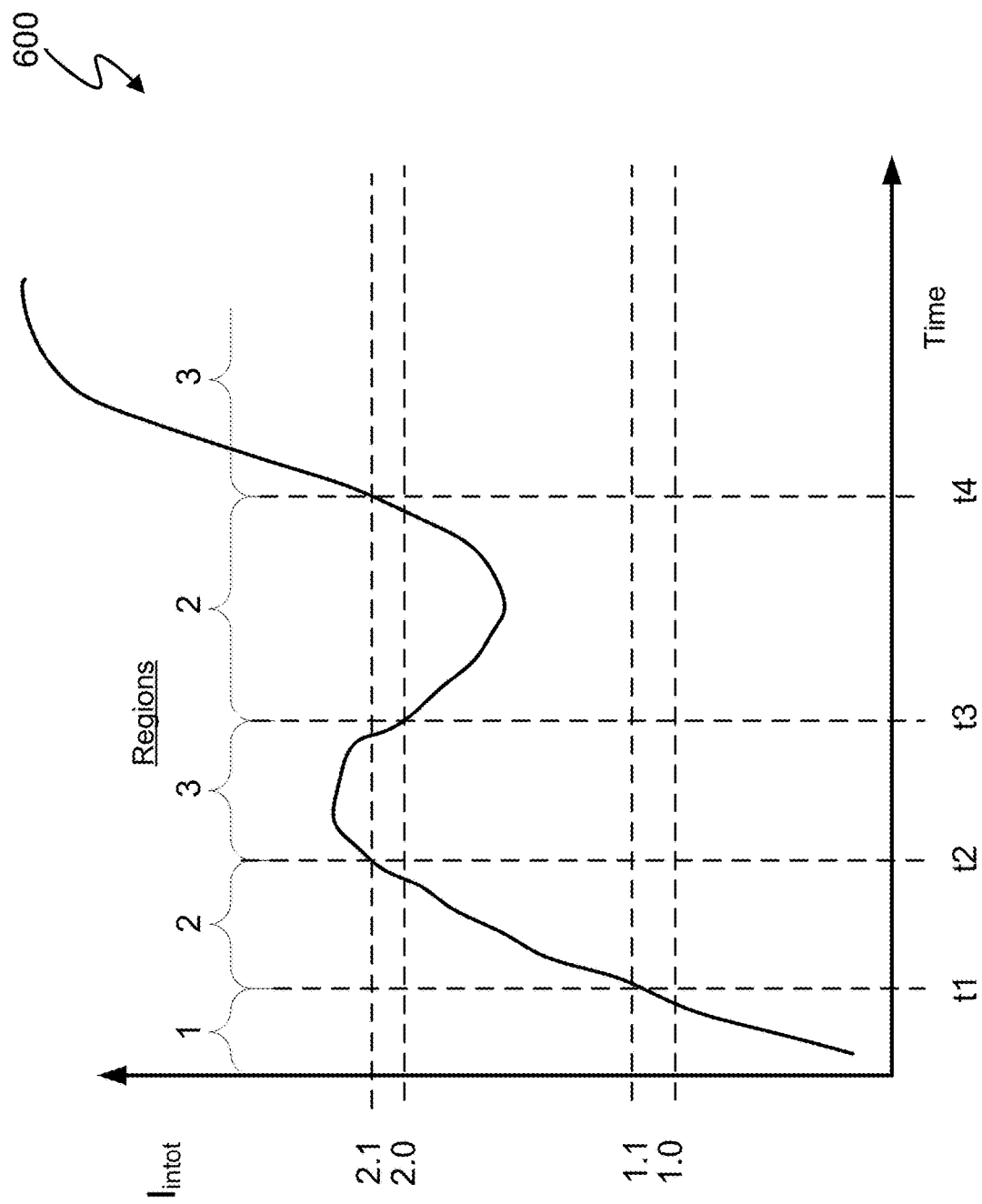
FIG. 6 depicts a graph of hysteresis windows used in the handoff of PCU control of the regulation a power to the load.

FIG. 6 depicts a graph 600 of hysteresis windows used in the handoff of PCU control of the ROP. An amount of hysteresis may be introduced at threshold levels at which control of the ROP is handed off. For example, one or more of the current threshold limits $I_{LIM1}$ through $I_{LIM4}$ may have corresponding hysteresis to prevent oscillating handoff of control of the ROP between the PCUs at the threshold limit points. In other words, each current threshold limit may have a positive region-to-region transition trend value and a negative region-to-region transition trend value. In the embodiment of FIG. 6, the positive region-to-region transition trend value of $I_{LIM1}$ is 1.1 A, the negative region-to-region transition trend value of $I_{LIM1}$ is 1.0 A, the positive region-to-region transition trend value of $I_{LIM2}$ is 2.1 A, the negative region-to-region transition trend value of $I_{LIM2}$ is 2.0 A, and so on. In this example, the specific total input current $I_{intot}$ at which control of the ROP is handed off between PCU(1), PCU(2), and PCU(3) depends on whether the total input current $I_{intot}$ to the PCUs is rising or falling. In graph 600, handoff of control of the ROP from PCU(1) to PCU(2) occurs at time t1 as the total current $I_{intot}$ to the PCUs above 1.1 A. As the total current $I_{intot}$ to the PCUs continues to rise and reaches 2.1 A at time t2, handoff of control of the ROP is passed from PCU(2) to PCU(3). However, as the total input current $I_{intot}$ drops, the handoff of control of the ROP back to PCU(2) does not occur at 2.1 A. Rather, the handoff from PCU(3) to PCU(2) occurs at time t3 when $I_{intot}$ goes below 2 A. This timing provides hysteresis to reduce or eliminate high frequency control handoff oscillations between PCUs. Once the current $I_{intot}$ falls below 2 A and again starts increasing, handoff between PCU(2) and PCU(3) occurs at 2.1 A at time t4. FIG. 6 also shows a hysteresis window of 0.1 A for handoff of the ROP between PCU(1) and PCU(2), where handoff from PCU(1) to PCU(2) occurs as the current reaches 1.1 A and handoff from PCU(2) to PCU(1) occurs as the current decreases below 1 A. It will be recognized that various hysteresis schemes and transition levels other than those shown in FIG. 6 may be used in the disclosed power systems.

Figure 7:
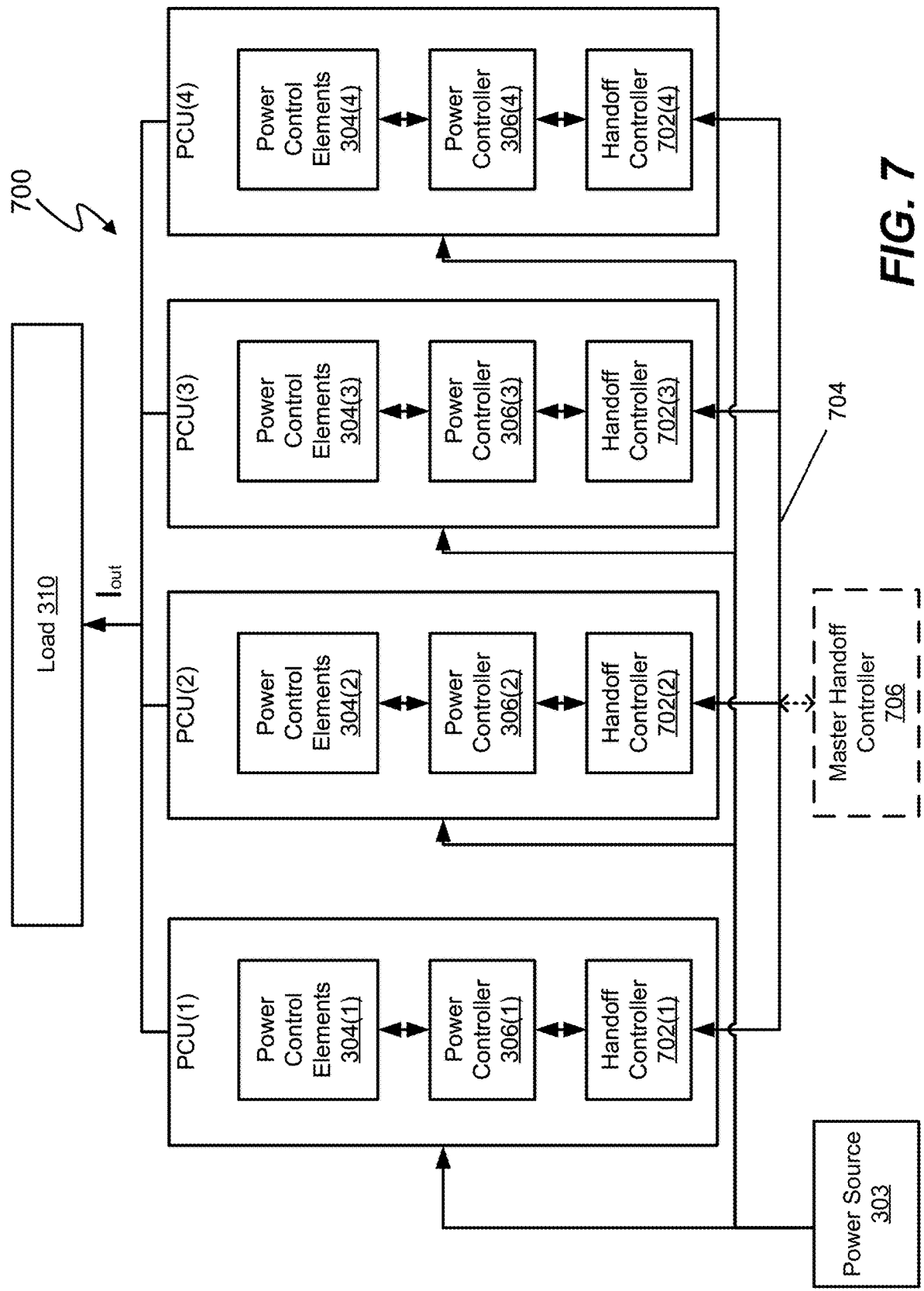
FIG. 7 depicts another embodiment of a power system including a common communication system for PCU-to-PCU handoff of the control of the regulation of power to the load.

FIG. 7 depicts another embodiment of a power system 700 including a common communication system for PCU-to-PCU handoff of control of the ROP. As shown, power system 700 includes multiple power control units PCU(1)-PCU(4) each having a respective handoff controller 702(1:4). Unlike the implementation of the power regulation handoff communication control system 330 shown in FIG. 3, the handoff controllers 702(1:4) are connected to a common communication bus 704. In one example, each of handoff controllers 702(1:4) is capable of communicating directly with every other handoff controller 702(1:4) thereby allowing handoff of control of the ROP from any one PCU to any other PCU of the power system 700. In such cases, each of the handoff controllers 702(1:4) executes its own handoff selection algorithm to determine which PCU is to receive control of the ROP. The handoff selection algorithm of each of handoff controllers(1:4) is a matter of design choice and depends on, for example, a desired handoff strategy that may be predetermined or may take into account operational parameters of the power system 700. For example, in at least some embodiments, the handoff selection algorithm of each of handoff controllers (1:4) is identical, a proper subset of the handoff controllers (1:4) execute the same handoff selection algorithm while the remaining handoff controller(s) execute a different handoff selection algorithm, or each selection algorithm for each of the handoff controllers (1:4) is different. The available handoff selection algorithms are thus expanded beyond those available in a daisy chained PCU implementation. In one example, the handoff selection algorithm transfers control of the ROP randomly to another PCU. In at least one embodiment, each of the handoff controllers 702(1:4) receives operational parameter data from components of the power system 700 including, in at least one embodiment, from each PCU(1:4). In at least one embodiment, the currently controlling handoff controller 702(i) processes the operational parameters and then determines in accordance with the handoff selection algorithm of the currently controlling PCU which PCU to handoff control. For example, the currently controlling handoff controller 702(i) processes the operational parameters and determines that all operational parameters are within normal operating limits. In this scenario, the controlling handoff controller 702(i) hands off control of the ROP to the load 302 in accordance with predetermined or random sequencing. However, if, for example, an operational parameter of PCU (n) indicates a thermal value above a predetermined threshold, the handoff selection algorithm of controlling handoff controller 702(i) actively avoids handing ROP control to PCU(n), where "i" and "n" are index values, "i" and "n" are elements of the set {1, 2, 3, 4}, and "i" does not equal "n". For example, if "i" is "1", then PCU(i) is PCU(1), and PCU(n) is either PCU(2), PCU(3), or PCU(4) but not PCU(1).

In another example, an optional master handoff controller 706 is connected to the common communication bus 725 to control handoff controllers 702(1:4). In at least one embodiment, master handoff communication controller 706 controls ROP control handoff by handoff controllers 702(1:4) in accordance with a master handoff selection algorithm. The particular master handoff algorithm of master handoff communication controller 706 is a matter of design choice and, in at least one embodiment, follows the same process as an individual handoff controller selection algorithm. In one implementation, the master handoff selection algorithm is based on one or more operating parameters. For example, in at least one embodiment, the master handoff controller 725 monitors a level of the operating parameter to determine if the operating parameter has reached a predetermined threshold level. When the master handoff communication controller 706 detects that one or more operating parameters of the currently controlling PCU(i) has reached a predetermined threshold level is predicted to reach the threshold level within a predetermined period of time, the master handoff controller 706 then directs one or more of the handoff controllers 702(1:4) to place respective PCUs(1:4) in a defined operating state dictated by the master handoff selection algorithm. For example, in at least one embodiment, the master handoff controller 706 directs PCU(i) to relinquish control of the ROP and direct PCU(n) to accept control of the ROP. Further, in at least one embodiment, the master handoff controller 706 directs PCU(i) to maintain a power output at a predetermined constant power level after PCU(n) accepts control of the ROP to the load 310. In at least one embodiment, the master handoff controller 725 directs multiple PCUs to provide specific amounts of power to the load 310 that are dependent on which PCU has control of the ROP. Other handoff selection algorithms may also be implemented as a matter of design choice.

Figure 8:
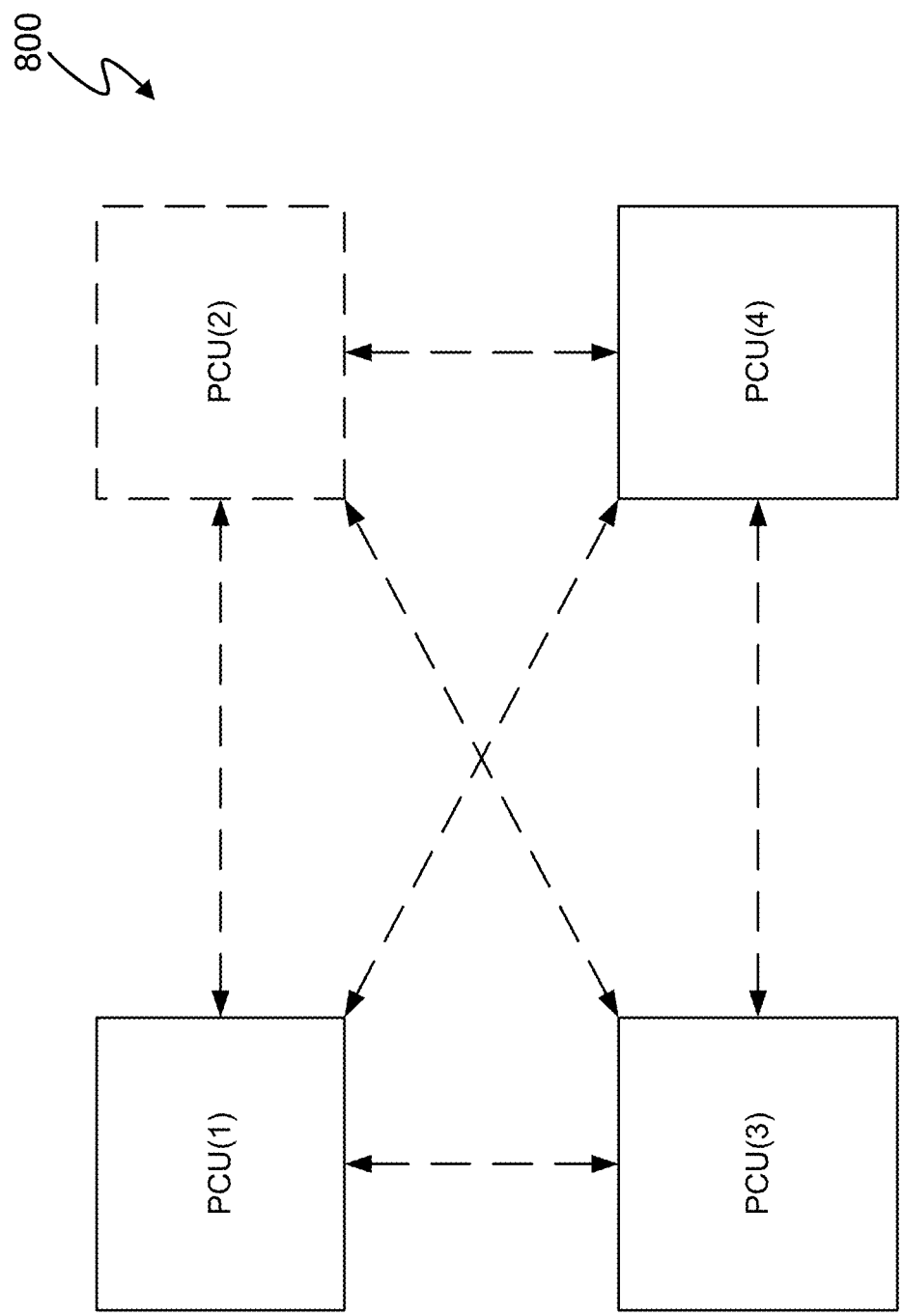
FIG. 8 depicts a power system with a flexible PCU-to-PCU handoff communication configuration.

FIG. 8 depicts a power system 800 with a flexible PCU-to-PCU handoff communication configuration, such as power system 300 (FIG. 3) with flexible transition sequencing of PCU-to-PCU handoff control of the ROP to a load, such as load 310. In at least one embodiment, the flexible sequencing is (i) ordered, (ii) partially ordered and partially order-independent where some PCU-to-PCU handoff control transitions are ordered and some are order-independent, or (iii) fully order-independent sequencing. The full components of the power system 800 are not shown in FIG. 8 for clarity, but are, in at least one embodiment, the same as the power system 300. The dotted lines represent multi-directional, communication path choices between each of the PCUs(1:4). In power system 800, at least one of the PCUs (1:4) is communicatively coupled to at least two other PCUs(1:4). In at least one embodiment, all of the PCUs(1:4) are coupled to every other PCU(1:4). For example, PCU(1) is communicatively coupled to PCUs(2:4), PCU(2) is communicatively coupled to PCUs(1, 3, and 4), and so on. The phrase "communicatively coupled" refers to the existence of a communication path that allows two devices to communicate with each other.

In at least one embodiment, the handoff control selection algorithm (not shown) allows PCU-to-PCU hand off of ROP to load 310 in accordance with the same basic principle as described in conjunction with FIGS. 4 and 5, or in accordance with a master handoff selection algorithm as described in conjunction with FIG. 7. In other words, PCU(i) hands off control of ROP to load 310 to PCU(n) when the handoff selection algorithm of PCU(i) or a master handoff selection algorithm determines that the handoff is appropriate. For example, in at least one embodiment, the handoff from PCU(i) to PCU(n) occurs when an operational parameter reaches a threshold value. In at least one embodiment, the handoff from PCU(i) to PCU(n) occurs when the power demand of the load 310 changes. For example, PCU(i) maintains a constant current output when the power demand of the load 310 increases when PCU(n) begins ROP to load 310. Alternatively, PCU(i) hands off control of ROP to load 310 to PCU(n), and PCU(i) stops providing power to the load 310 when the power demand of the load 310 decreases. However, the sequencing of the hand off of ROP of the load 310 from PCU-to-PCU is flexible and may be any ordered, partially ordered and partially order-independent, or order independent sequencing.

Figure 9:
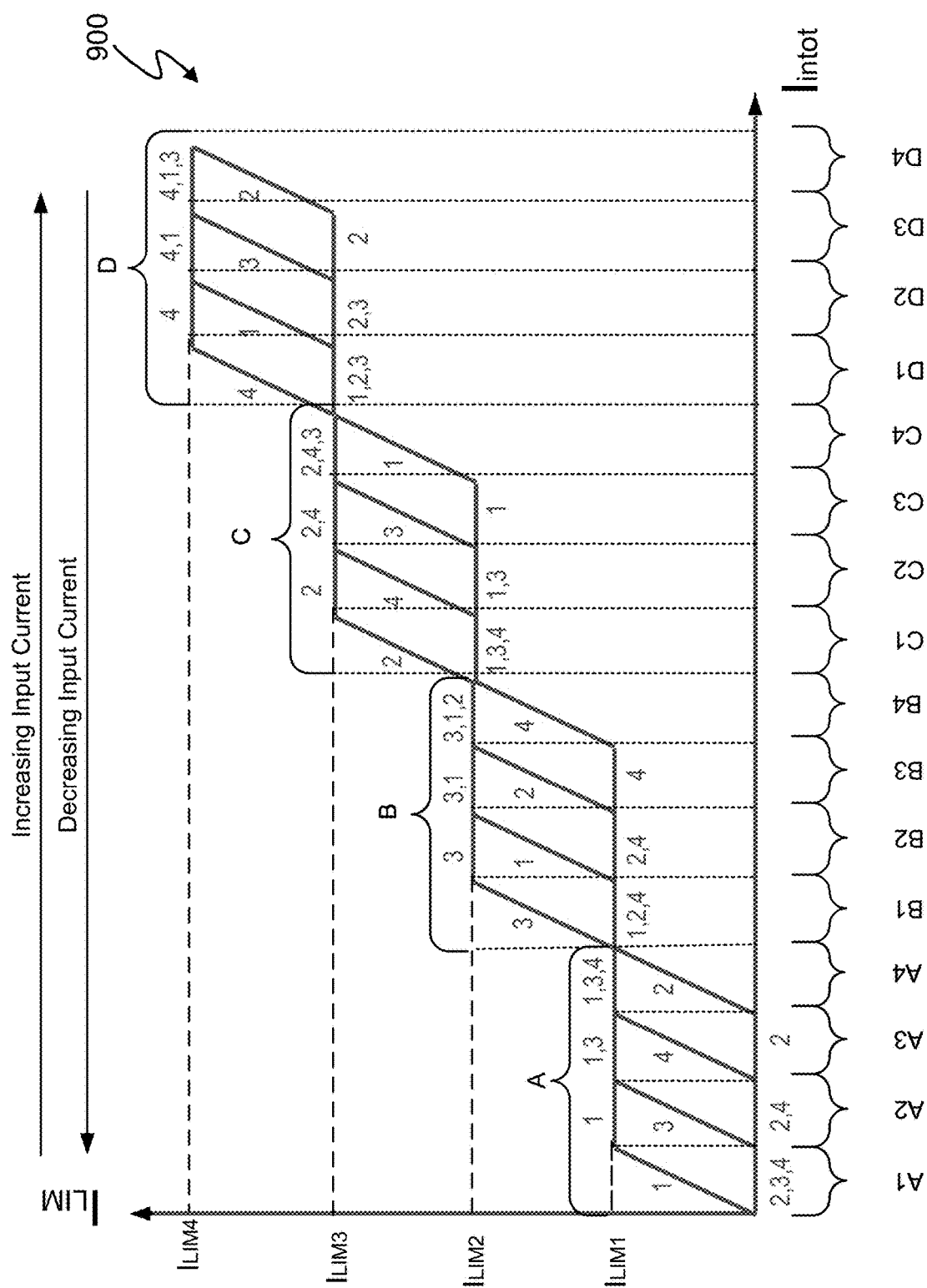
FIG. 9 depicts a transition diagram for PCU-to-PCU handoff of control of the regulation of power to the load in the power supply system shown in FIG. 7.

FIG. 9 depicts a transition diagram 900 for PCU-to-PCU handoff of the control of the ROP in the power supply system 700. As in the transition diagram 500 (FIG. 5), master handoff communication controller 730 controls handoff of the ROP in response to the input current $I_{in}$ at each PCU. However, handoff between the PCUs (1:4) in transition diagram 900 does not proceed in the daisy chained manner shown in FIG. 5. Referring to FIGS. 5 and 9, PCU(1) is the controlling PCU in sub-region A1. As the power requirements of the load 310 increase, the input current $I_{in1}$ to PCU(1) reaches the first threshold level $I_{LIM1}$, and the handoff controller PCU(1) hands off control of the ROP to load 310 to PCU(3). PCU(3) maintains control of the ROP in sub-region A2 until its input current $I_{in3}$ reaches the first threshold level $I_{LIM1}$, at which point control of the ROP is passed to PCU(4). PCU(4) maintains control of the ROP in sub-region A3 until its input current $I_{in4}$ reaches the first threshold level $I_{LIM1}$, at which point control of the ROP is passed to PCU(2). PCU(2) maintains control of the ROP in sub-region A4 until the input current $I_{in2}$ reaches the first threshold level $I_{LIM1}$, at which point the control of the ROP is handed off to PCU(3) and the power supply 700 continues its operation into Region B. As shown by this example, each of the regions A, B, C, and D have different PCU handoff sequences. Further, as in the transition diagram of FIG. 5, the PCUs may handoff control of the ROP in response to both increasing and decreasing total input current $I_{intot}$ to the PCUs.

Figure 10:
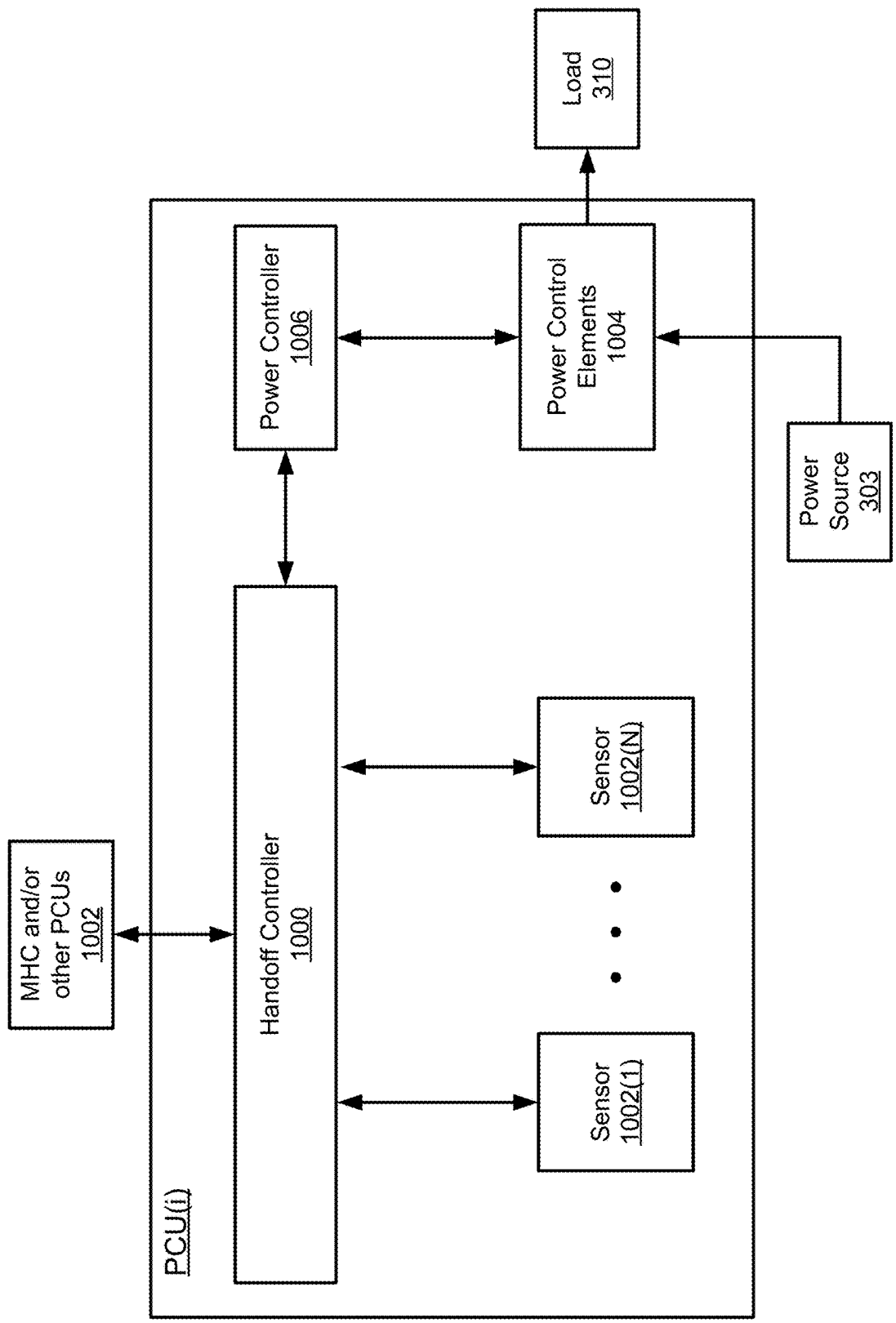
FIG. 10 depicts an exemplary power system with PCU-to-PCU handoff of control of the regulation of power to the load.

FIG. 10 depicts one embodiment of a PCU(i) having PCU-to-PCU handoff of control of the ROP capability. The index "(i)" is a value that identifies any of the PCUs. As shown, PCU(i) includes power control elements 1004 and a power controller 1006 such as the types disclosed above. Further, PCU(i) includes a handoff controller 1000 that communicates with the master handoff controller (MEW) (FIG. 7) and/or other PCUs 1002, such as PCUs(1:M) (FIGS. 2 and 3) to receive and request handoff of the control of the ROP. When the handoff controller 1000 has control of the ROP and a master handoff selection algorithm initiates a PCU-to-PCU ROP control handoff, the handoff controller 1000 requests the controlling PCU to handoff ROP control to another PCU in response to, for example, one or more operational parameters or in accordance with a pre-determined handoff algorithm. In at least one embodiment, the handoff controller 1000 is connected to and receives data from one or more sensors 1002(1:N), where N is greater than or equal to 1. The quantity, disposition, and type of sensors (1:N) is a matter of design choice. Exemplary types of sensors 1002(1:N) are thermal sensor(s), individual PCU current input sensors, total power supply output current sensor, power supply output voltage sensor, total power supply input current sensor, PCU current output sensors, PCU power output sensors, etc. Individual PCUs, such as PCUs(1:M) (FIG. 2) may request handoff of the control of the ROP in response to detection of one or more of the sensors 1002(1:M) reaching one or more predetermined threshold levels. Further, the PCUs may monitor different operational parameters for the handoff. For example, PCU (1) may use a current input threshold to trigger a request for handoff while PCU(2) uses a temperature threshold to trigger a request for handoff. In such instances, the PCU(1) and PCU(2) are using distinct operational parameters to trigger requests for handoff.

Figure 11:
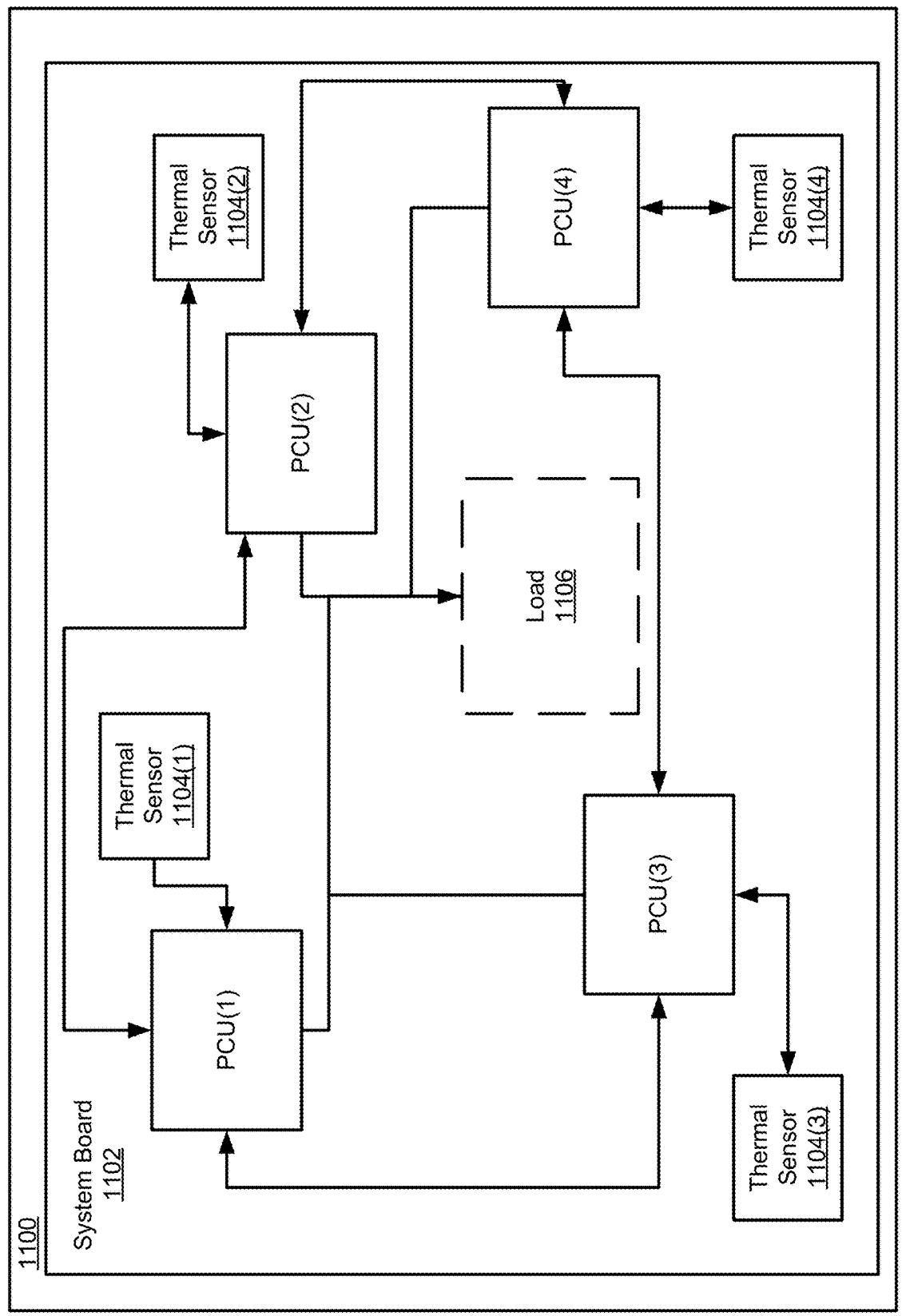
FIG. 11 depicts an embodiment of an apparatus having a plurality of physically dispersed PCUs with PCU-to-PCU handoff of control of the regulation of power to a load.

FIG. 11 depicts an embodiment of an apparatus 1100 having a plurality of physically dispersed PCUs(1:4) with PCU-to-PCU handoff of control of the ROP. For example, in at least one embodiment the apparatus 1100 includes a system board 1102, such as a printed circuit board (PCB) or an integrated circuit, that includes the PCUs(1:4). The disposition of PCUs(1:4) as mounted circuits for a PCB system board 1102 or as integrated functional units for an integrated circuit system board 1102 is a matter of design choice. In at least one embodiment, the PCUs(1:4) are laid out on the system board 1102 to distribute and manage local thermal areas on the system board 1102. Each of PCUs(1:4) receives temperature data from a respective thermal sensor 1104(1:4). The particular type and fabrication of the thermal sensor 1104(1:4) is a matter of design choice.

During operation of the apparatus 1100, the thermal sensors 1002(1:4) monitor the temperatures of respective PCUs(1:4) and/or the temperature of the system board 1102 proximate to respective PCUs(1:4). When PCU(i) has control of the ROP to the load 1106, PCU(i) monitors the temperature information received from thermal sensor 1104(i). Load 1106 is any load, such as load 310. Load 1106 is shown in dotted lines because, in at least one embodiment, system board 1002 incorporates load 1106, and, in at least one embodiment, system board 1102 connects to an externally located load 1106. If thermal sensor 1104(i) detects a temperature that exceeds a predetermined temperature threshold level, PCU(i) requests a local or master handoff controller (not shown) to handoff control to PCU(n) of the ROP to load 1106 as previously described. Furthermore, when PCU(n) receives a request for transfer of the control of the ROP from PCU(i), PCU(n) may deny the request if the temperature sensed by thermal sensor 1104(n) exceeds a predetermined threshold level. The apparatus 1100 exercises distributed and independent control of the PCU-to-PCU handoff of the ROP to load 1106 to maintain functionality overall functionality, distribute PCU workload and associated PCU thermal generation, distribute thermal generation on system board 1002, and reduce the thermal stress on any given PCU. In some exemplary embodiments, operating parameters in addition to a temperature threshold are used as threshold criteria for transferring control of the ROP to the load.

Figure 12:
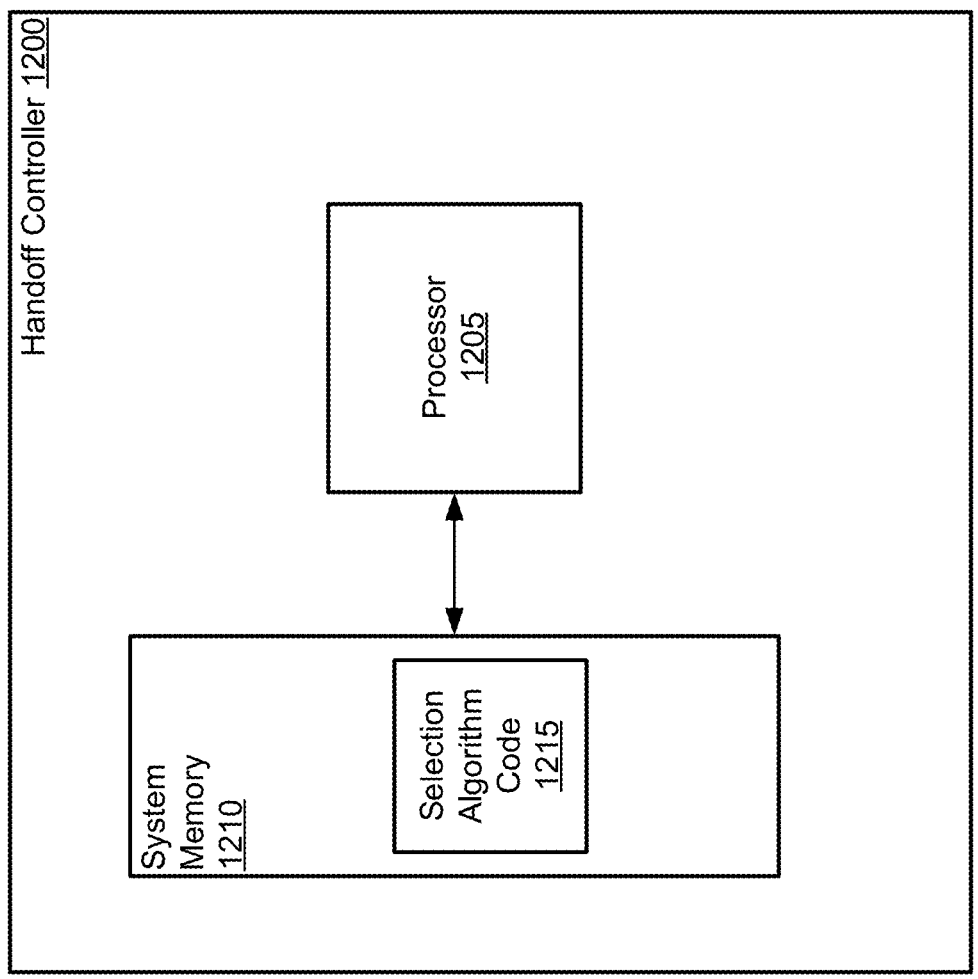
FIG. 12 depicts an exemplary block diagram of a handoff controller.

FIG. 12 shows one embodiment of a handoff controller 1200 that may be respectively implemented in each PCU(i) and/or as the master handoff controller 706. In this embodiment, the handoff controller 1200 includes a processor 1205 and system memory 1210. The system memory 1210 includes selection algorithm code 1215 that is executable by the processor 1205 to implement the selection algorithm used to receive control of the ROP from another PCU and/or transfer control of the ROP to another PCU. The selection algorithm is a matter of design choice. Examples of such selection algorithms are shown in FIGS. 4, 5, 8, and 9.

Although embodiments have been described in detail, it should be understood that various changes, substitutions, and alterations can be made hereto without departing from the spirit and scope of the invention as defined by the appended claims.

What is claimed is:

1. An apparatus comprising:
a power supply system for providing power to a load, the power supply system comprising:
a plurality of power conversion units (PCUs) configured to provide power to the load, wherein each PCU includes an output to couple to the load and during operation of the power supply system:
(i) there is a one-to-many relationship between the load and the plurality of PCUs;
(ii) at a first time period one of the PCUs provides power to the load;
(iii) at a second time at least two of the PCUs provide power to the load; and
(iv) when one or more of the PCUs provide power to the load, only one of the PCUs controls regulation of the power to the load at a given time; and
one or more power regulation handoff communication control systems to transfer control of the regulation of the power to the load among the PCUs.

2. The apparatus of claim 1 wherein the one or more power regulation handoff communication control systems transfer control of the regulation of the power to the load among the PCUs in response to detection of an operating parameter of the power supply system reaching a predetermined threshold level.

3. The apparatus of claim 2, wherein the predetermined threshold level comprises one or more of:
a PCU current input threshold level;
a PCU current output threshold level;
a PCU thermal threshold level; and
a PCU control loop output voltage threshold level.

4. The apparatus of claim 3, wherein the PCU current input threshold level comprises a quantized input current level, and the quantized current input level is less than a maximum quantized input current level of each PCU.

5. The apparatus of claim 2, wherein the operating parameter includes an operating parameter of the PCU controlling the regulation of the power to the load.

6. The apparatus of claim 2 wherein the one or more power regulation handoff communication control systems comprise:
a power regulation handoff communication control system included in each PCU, wherein the power regulation handoff communication and control system of each PCU is configured to:
whenever the PCU is not controlling regulation of the power to the load:
receive a handoff request from at least one of the other PCUs to take over power regulation control of the power to the load;
accept the handoff request; and
begin controlling regulation of the power to the load;
whenever the PCU is controlling regulation of the power to the load:
monitor a level of the operating parameter;
determine if the operating parameter has reached the predetermined threshold level;
at least by when the operating parameter has reached the predetermined threshold level, send a handoff request to one of the other PCUs to take over power regulation control of the power to the load;
upon acknowledgment of the sent handoff request; and
relinquish control of the regulation of power to the load.

7. The apparatus of claim 6, wherein the power regulation handoff communication control system of each PCU is configured to send the handoff request to a PCU selected in accordance with a selection algorithm.

8. The apparatus of claim 7, wherein, when the PCU is the controlling PCU and the PCU to which the handoff request fails to acknowledge the sent handoff request, a handoff request is sent to another one of the PCUs selected in accordance with the selection algorithm.

9. The apparatus of claim 7, wherein the selection algorithm comprises a daisy chain scheme to send the handoff request to a predetermined PCU in the daisy chain scheme.

10. The apparatus of claim 7, wherein the selection algorithm comprises a random selection scheme to send the handoff request to a randomly selected PCU.

11. The apparatus of claim 1, wherein after the PCU relinquishes control of the regulation of power to the load, the PCU that relinquished control continues to provide power to the load.

12. The apparatus of claim 1, wherein after the PCU relinquishes control of the regulation of power to the load, the PCU that relinquished control reduces its power output to the load.

13. The apparatus of claim 1, wherein the one or more power regulation handoff communication control systems comprise:
a follower handoff communication control system included in each of the PCUs; and
a master handoff communication control system coupled to each follower handoff communication control system of the PCUs, wherein the master handoff communication control system is configured to:
monitor a level of the operating parameter;
determine if the operating parameter has reached the predetermined threshold level; and
when the operating parameter has reached the predetermined threshold level, communicate with the follower handoff communication control system of a first PCU currently controlling regulation of the power to the load and a second follower handoff communication control system of a first PCU to direct transfer of the control of the regulation of the power to the load from the first PCU to the second PCU.

14. The apparatus of claim 1, wherein the one or more power regulation handoff communication control systems are further configured to transfer control of the regulation of the power to the load to a PCU that is currently providing power to the load.

15. The apparatus of claim 1, wherein the operating parameter is distinct for at least two of the PCUs.

16. The apparatus of claim 1, wherein during operation of the power supply system, multiple PCUs provide power to the load, including the PCU controlling the regulation of the power to the load.

17. The apparatus of claim 1, wherein each of the PCUs includes a switching power converter, and the switching power converter comprises one or more of:
a boost converter;
a buck converter;
a boost-buck converter; and
a Ćuk converter.

18. A method of operating a power supply system to provide power to a load, comprising:
operating a plurality of power conversion units (PCUs) to provide power to the load, wherein:
(i) there is a one-to-many relationship between the load and the plurality of PCUs;
(ii) at a first time period one of the PCUs provides power to the load;
(iii) at a second time period at least two of the PCUs provide power to the load; and
(iv) when one or more of the PCUs provide power to the load, only one of the PCUs controls regulation of the power to the load at a given time; and
transferring control of the regulation of the power to the load among the PCUs in response to detection of an operating parameter of the power supply system reaching a predetermined threshold level.

19. The method of operating the power supply system of claim 18, wherein the operating of the plurality of PCUs comprises:
whenever the PCU is not controlling regulation of the power to the load:
receiving a handoff request from at least one of the other PCUs to take over power regulation control of the power to the load;
accepting the handoff request; and
beginning control of the regulation of the power to the load;
whenever the PCU is controlling regulation of the power to the load:
monitoring a level of the operating parameter;
determining if the operating parameter has reached the predetermined threshold level;
at least by when the operating parameter has reached the predetermined threshold level, sending a handoff request to one of the other PCUs to take over power regulation control of the power to the load;
upon acknowledgment of the sent handoff request; and
relinquishing control of the regulation of power to the load.

20. The method of operating the power supply system of claim 19, wherein each PCU sends the handoff request to a PCU selected in accordance with a selection algorithm.

21. The method of operating the power supply system of claim 20, wherein, when the PCU is the controlling PCU and the PCU to which the handoff request fails to acknowledge the sent handoff request, a handoff request is sent to another one of the PCUs selected in accordance with the selection algorithm.

22. The method of operating the power supply system of claim 20, wherein the selection algorithm comprises a daisy chain scheme to send the handoff request to a predetermined PCU in the daisy chain scheme.

23. The method of operating the power supply system of claim 20, wherein the selection algorithm comprises a random selection scheme to send the handoff request to a randomly selected PCU.

24. The method of operating the power supply system of claim 20, further comprising:
continuing to provide power from the PCU that relinquished control of the regulation of power to the load after control has been relinquished.

25. The method of operating the power supply system of claim 20, further comprising:
reducing power output from the PCU that relinquished control of the regulation of power to the load after control has been relinquished.

26. The method of operating the power supply system of claim 18, wherein transferring control of the regulation of the power to the load comprises:
executing communications between a follower handoff communication control system included in each of the PCUs, and a master handoff communication control system coupled to each follower handoff communication control system of the PCUs;
using the master handoff communication control system to:
monitor a level of the operating parameter;
determine if the operating parameter has reached the predetermined threshold level; and
at least by when the operating parameter has reached the predetermined threshold level, communicate with the follower handoff communication control system of a first PCU currently controlling regulation of the power to the load and a second follower handoff communication control system of a first PCU to direct transfer of the control of the regulation of the power to the load from the first PCU to the second PCU.

27. The method of operating the power supply system of claim 18, further comprising:
transferring control of the regulation of the power to the load to a PCU that is currently providing power to the load.

28. The method of operating the power supply system of claim 18, wherein the operating parameter is distinct for at least two of the PCUs.

29. The method of operating the power supply system of claim 18, wherein the predetermined threshold level comprises one or more of:
a PCU current input threshold level;
a PCU current output threshold level;
a PCU thermal threshold level; and
a PCU control loop output voltage threshold level.

30. The method of operating the power supply system of claim 29, wherein the PCU current input threshold level comprises a quantized input current level, and the quantized current level is less than a maximum quantized input current level of each PCU.

31. The method of operating the power supply system of claim 29, wherein the PCU current input threshold level comprises a quantized input current level, and the quantized current level is less than a maximum quantized input current level of each PCU.

32. The method of operating the power supply of claim 18, wherein during operation of the power supply system, multiple PCUs provide power to the load, including the PCU controlling the regulation of the power to the load.

33. The method of operating the power supply of claim 18, wherein each of the PCUs includes a switching power converter, and the switching power converter comprises one or more of:
a boost converter;
a buck converter;
a boost-buck converter; and
a Ćuk converter.

* * * * *